US012322893B2

(12) United States Patent
Shimauchi

(10) Patent No.: US 12,322,893 B2
(45) Date of Patent: Jun. 3, 2025

(54) CONNECTOR

(71) Applicant: Mitsubishi Electric Corporation, Tokyo (JP)

(72) Inventor: Hideki Shimauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 487 days.

(21) Appl. No.: 17/892,520

(22) Filed: Aug. 22, 2022

(65) Prior Publication Data

US 2023/0318221 A1 Oct. 5, 2023

(30) Foreign Application Priority Data

Mar. 31, 2022 (JP) ................................ 2022-058537

(51) Int. Cl.

*H01R 13/50* (2006.01)
*H01R 43/24* (2006.01)
*H01R 13/04* (2006.01)

(52) U.S. Cl.

CPC ............ *H01R 13/50* (2013.01); *H01R 43/24* (2013.01); *H01R 13/04* (2013.01)

(58) Field of Classification Search

CPC ......... H01R 13/50; H01R 13/04; H01R 43/24
See application file for complete search history.

(56) References Cited

U.S. PATENT DOCUMENTS 5,563,510 A * 10/1996 Gorrell .................. G01P 3/488 174/541
6,200,171 B1 * 3/2001 Fusselman ............ H01R 43/24 439/736
6,793,533 B2 * 9/2004 Berg .................... H01R 13/405 439/620.04
7,192,317 B2 * 3/2007 Nakagawa ........ B29C 45/14836 439/736

(Continued)

FOREIGN PATENT DOCUMENTS

JP 54-7343 Y2 4/1979
JP 61-42789 U 3/1986

(Continued)

OTHER PUBLICATIONS

Japanese Office Action issued Sep. 5, 2023 in Patent Application No. 2022-058537.

(Continued)

*Primary Examiner* — Harshad C Patel
(74) *Attorney, Agent, or Firm* — Sughrue Mion, PLLC

(57) ABSTRACT

A connector includes: a housing portion in which a plurality of conductive terminals having an L-shape are covered by a resin; and a connector portion in which one end portions of the conductive terminals are exposed from the resin to serve as connector terminals. The plurality of conductive terminals are disposed so as to be arranged along a plane. When the plane is defined as a yz-plane and a direction in which the connector terminals are arranged is defined as a z-axis direction, the connector terminals are disposed so as to be (Continued)

arranged with an interval therebetween in the z-axis direction, and a width in an x-axis direction of the housing portion is increased in accordance with a distance in a y-axis direction from the connector portion.

8 Claims, 10 Drawing Sheets

(56) References Cited

U.S. PATENT DOCUMENTS

| | | | | |
|---|---|---|---|---|
| 8,435,050 | B2 * | 5/2013 | Tziviskos | H01R 12/724 439/736 |
| 9,944,002 | B2 * | 4/2018 | Takiguchi | G01D 5/145 |
| 10,641,623 | B2 * | 5/2020 | Ikeda | G01D 11/245 |
| 10,651,609 | B2 * | 5/2020 | Ueno | G01L 19/143 |
| 10,907,988 | B2 * | 2/2021 | Kuwamura | G01D 5/145 |
| 2012/0270448 | A1 | 10/2012 | Tziviskoes et al. | |
| 2012/0291542 | A1 | 11/2012 | Fujita et al. | |
| 2012/0293169 | A1 | 11/2012 | Tsujii et al. | |

FOREIGN PATENT DOCUMENTS

| | | |
|---|---|---|
| JP | 2005-19053 A | 1/2005 |
| JP | 5172006 B1 | 3/2013 |

OTHER PUBLICATIONS

Japanese Office Action issued May 9, 2023 in Patent Application No. 2022-058537.

Notification of Reasons for Refusal dated Mar. 28, 2023 from the Japanese Patent Office in Application No. 2022-058537.

* cited by examiner

CONNECTOR

BACKGROUND OF THE INVENTION

1. Field of the Invention

The present disclosure relates to a connector.

2. Description of the Background Art

In some wiring connectors that are used in electrical equipment or the like of vehicles, a connector terminal is provided at a right angle to the wiring introduction direction from the viewpoint of space saving. For example, there is a connector in which a plurality of L-shaped metal terminals having different sizes are covered by a resin and insert-molded. In this connector, the plurality of metal terminals are disposed so as to be at least partially overlapped with each other when viewed from the connector terminal side.

When a plurality of L-shaped metal terminals having different sizes are insert-molded with a resin, one end portion of each metal terminal that will become a connector terminal is inserted into a lower mold. At this time, occurrence of variation in length of the end portions of the metal terminals inserted into the lower mold will cause variation in length in the parts, of the connector terminals, that will be exposed from the resin. When there is variation in length of the connector terminals, reliability of electrical connection of the connector is reduced.

As a conventional connector that addresses such a problem, a connector in which a protrusion is provided at one end portion of each metal terminal to be a connector terminal has been disclosed. In this connector, when one end portion of the metal terminal is to be inserted into a lower mold, the metal terminal is inserted into the lower mold with the protrusion being pressed. In the connector having such a configuration, since each metal terminal is inserted into the lower mold with the protrusion being pressed, occurrence of variation in length in the end portions of the metal terminals inserted into the lower mold can be prevented (see Patent Document 1, for example).

Patent Document 1: Japanese Patent No. 5172006

After one end portion of each metal terminal has been inserted into the lower mold, an upper mold is disposed on the lower mold, and the space between the molds is filled with a resin. In this manner, the connector is insert-molded. In the conventional connector, it is possible to prevent occurrence of variation in length of end portions of the metal terminals inserted into the lower mold. However, since the protrusion is not pressed at the time of loading of the resin, there is a possibility that the metal terminals inserted in the lower mold are moved due to the loading of the resin. That is, the conventional connector produced by insert molding has a problem that the lengths of connector terminals are varied due to loading of a resin.

SUMMARY OF THE INVENTION

The present disclosure has been made in order to solve the above-described problem. An object of the present disclosure is to provide a connector that is produced by insert molding and that does not have variation in length of connector terminals.

A connector of the present disclosure is a connector including: a housing portion in which a plurality of conductive terminals having an L-shape and having different sizes are covered by a resin; and a connector portion in which one end portions of the conductive terminals are exposed from the resin to serve as connector terminals. The plurality of conductive terminals are disposed so as to be arranged along a plane. When the plane is defined as a yz-plane and a direction in which the connector terminals are arranged is defined as a z-axis direction, the connector terminals are disposed so as to be arranged with an interval therebetween in the z-axis direction, and a width in an x-axis direction of the housing portion is increased in accordance with a distance in a y-axis direction from the connector portion.

In the connector of the present disclosure, the width in the x-axis direction of the housing portion is increased in accordance with the distance in the y-axis direction from the connector portion. Therefore, occurrence of variation in length of the connector terminals when the connector is produced by insert molding can be prevented.

DETAILED DESCRIPTION OF THE PREFERRED EMBODIMENTS OF THE INVENTION

Figure 1:
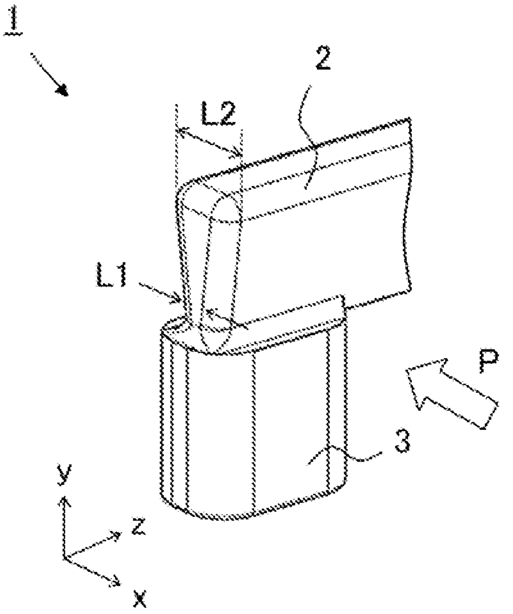
FIG. 1 is an external view of a connector according to a first embodiment.

Hereinafter, connectors according to embodiments for carrying out the present disclosure will be described in detail with reference to the drawings. In the drawings, the same reference characters denote the same or corresponding parts.

First Embodiment

Figure 2:
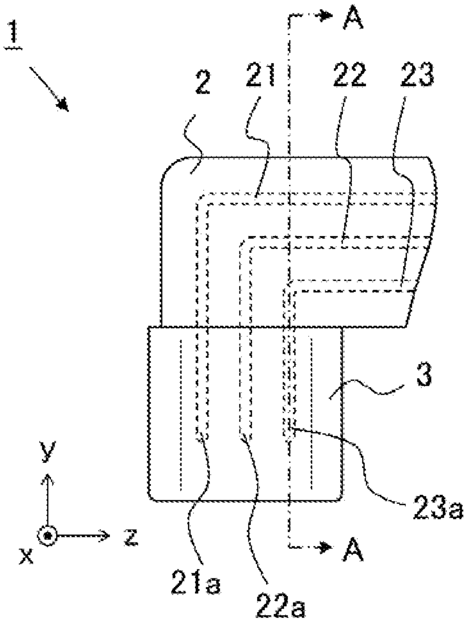
FIG. 2 is a side view of the connector according to the first embodiment.
Figure 3:
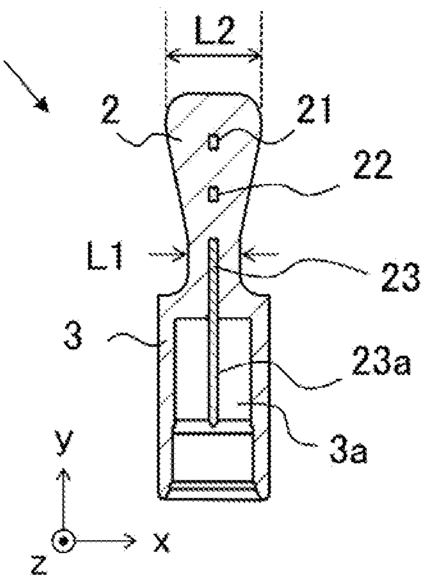
FIG. 3 is a cross-sectional view of the connector according to the first embodiment.

FIG. 1 is an external view of a connector according to a first embodiment. A connector 1 of the present embodiment is composed of a housing portion 2 and a connector portion 3. The housing portion 2 and the connector portion 3 are integrally molded by a resin. FIG. 2 is a side view of the connector 1 viewed in a direction of an arrow P in FIG. 1. In FIG. 2, three L-shaped conductive terminals 21, 22, 23 having different sizes and fixed to the inside of the connector 1 are indicated by broken lines. For the conductive terminals 21, 22, 23, a copper alloy such as phosphor bronze or brass can be used, for example. The three conductive terminals 21, 22, 23 are insert-molded inside the housing portion 2 and the connector portion 3. Bent portions of the three L-shaped conductive terminals 21, 22, 23 are positioned inside the housing portion 2. Leading ends of the three conductive terminals 21, 22, 23 on the connector portion 3 side are connector terminals 21*a*, 22*a*, 23*a*, respectively. End portions of the three conductive terminals 21, 22, 23 on the housing portion 2 side are connected to an introduction portion on the wiring side (not shown). FIG. 3 is a cross-sectional view of the connector 1, viewed from A-A in FIG. 2. As shown in FIG. 3, an opening 3*a* is provided inside the connector portion 3. The connector terminals 21*a*, 22*a*, 23*a* are exposed, inside this opening 3*a*, from the resin. In the connector portion 3, the connector terminals 21*a*, 22*a*, 23*a* are electrically connected to external terminals inserted into the opening 3*a*.

As seen from FIG. 2 and FIG. 3, the three conductive terminals 21, 22, 23 are disposed so as to be arranged along a plane. This plane is defined as a yz-plane, and the direction in which the connector terminals 21*a*, 22*a*, 23*a* are arranged is defined as a z-axis direction. Then, the direction orthogonal to the z-axis direction in the yz-plane is defined as a y-axis direction, and the direction orthogonal to the y-axis direction and the z-axis direction is defined as an x-axis direction. As shown in FIG. 2, the connector terminals 21*a*, 22*a*, 23*a* are disposed so as to be arranged with an interval therebetween in the z-axis direction. The positions in the y-axis direction of the tip of the connector terminals 21*a*, 22*a*, 23*a* are aligned with each other. The conductive terminals 21, 22, 23 extend in the y-axis direction from the connector terminals 21*a*, 22*a*, 23*a*, respectively, are bent at bent portions inside the housing portion 2, and then extend in the z-axis direction.

As shown in FIG. 1 and FIG. 3, the width in the x-axis direction of the housing portion 2 at a position close to the connector portion 3 is defined as L1, and the width in the x-axis direction of the housing portion 2 at a position far from the connector portion 3 is defined as L2. In the connector 1 of the present embodiment, L2 is larger than L1. In other words, the width in the x-axis direction of the housing portion 2 is increased in accordance with the distance in the y-axis direction from the connector portion 3. In the connector having such a configuration, variation in length of the connector terminals is not caused when the connector is produced by insert molding.

In the following, the reason will be described in detail with reference to a connector of a comparative example, after the production steps of the connector produced by insert molding are described.

Figure 4:
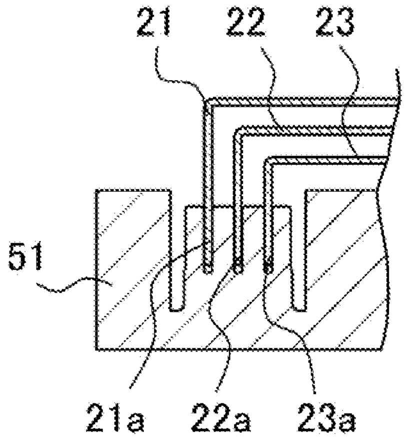
FIG. 4 is a schematic diagram showing a production step of the connector according to the first embodiment.
Figure 5:
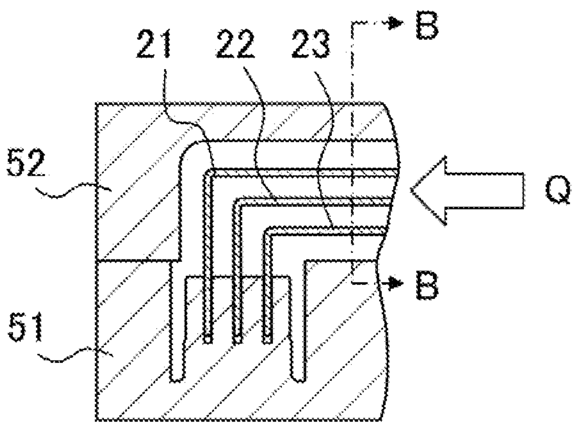
FIG. 5 is a schematic diagram showing a production step of the connector according to the first embodiment.

FIG. 4 and FIG. 5 are schematic diagrams showing production steps of the connector produced by insert molding. A shown in FIG. 4, leading end portions of the conductive terminals 21, 22, 23 are inserted into a terminal insertion portion of a lower mold 51. The parts, of the conductive terminals 21, 22, 23, inserted into the terminal insertion portion of the lower mold 51 become the connector terminals 21*a*, 22*a*, 23*a*. Next, as shown in FIG. 5, an upper mold 52 is disposed on the lower mold 51. When a connector is to be produced by insert molding, a molding resin in a liquid state is loaded from the direction of an arrow Q in FIG. 5. Here, the reason why the molding resin is loaded from the part that will become the housing portion is that a loading port for the molding resin cannot be provided to the mold at the position that corresponds to the connector portion where dimensional accuracy is required. As the molding resin, a thermoplastic resin can be used, for example.

Next, a connector of a comparative example will be described.

Figure 6:
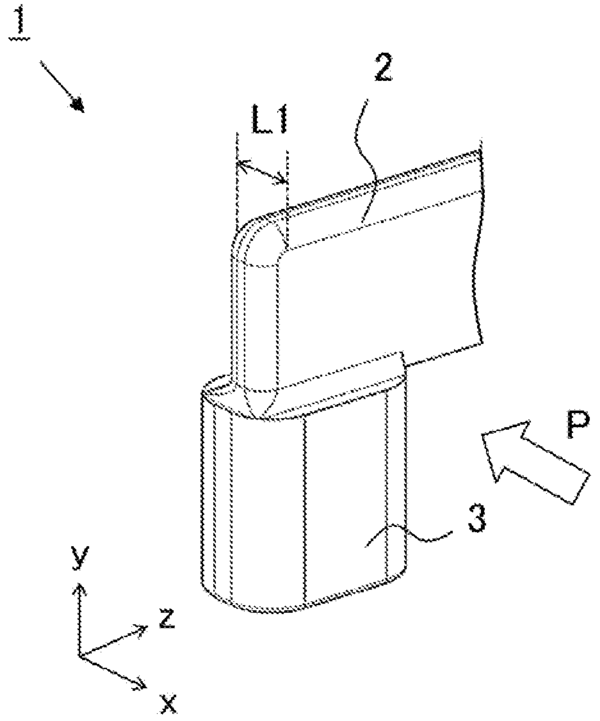
FIG. 6 is an external view of a connector of a comparative example according to the first embodiment.
Figure 7:
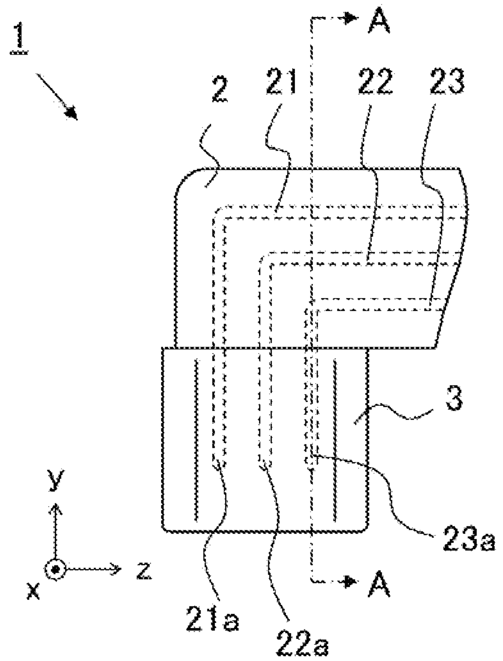
FIG. 7 is a side view of the connector of the comparative example according to the first embodiment.
Figure 8:
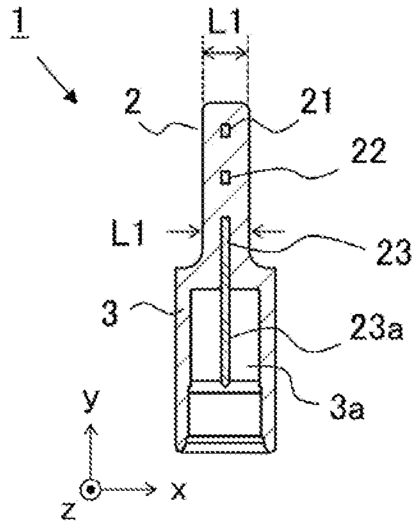
FIG. 8 is a cross-sectional view of the connector of the comparative example according to the first embodiment.

FIG. 6 is an external view of a connector of a comparative example according to the present embodiment. FIG. 7 is a side view of a connector 1, viewed in the direction of an arrow P in FIG. 6. FIG. 8 is a cross-sectional view of the connector 1, viewed from A-A in FIG. 7. As shown in FIG. 6 and FIG. 8, in the connector 1 of the comparative example, the width L1 in the x-axis direction of the housing portion 2 is constant, irrespective of the distance in the y-axis direction from the connector portion 3.

Figure 9:
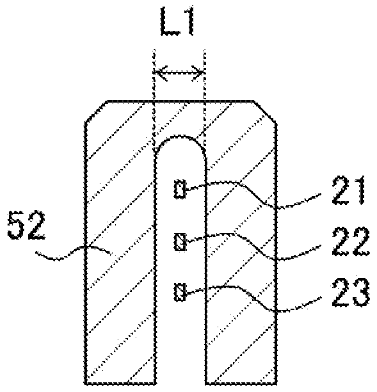
FIG. 9 is a cross-sectional view of an upper mold for the connector of the comparative example according to the first embodiment.

FIG. 9 is a cross-sectional view of the upper mold 52, viewed from B-B in FIG. 5 when the connector of the comparative example is produced by insert molding. As shown in FIG. 9, the width L1 of a cavity portion of the upper mold 52 that will become the housing portion 2 of the connector 1 of the comparative example is constant in the direction in which the conductive terminals 21, 22, 23 are arranged.

With respect to the molding resin in a liquid state that is loaded into a mold, due to the viscosity of the material thereof, the flow resistance becomes high at a portion where the molding resin comes into contact with the mold and the conductive terminals. Therefore, the filling speed of a molding resin 61 becomes slow at a portion where the molding resin 61 comes into contact with the mold and the conductive terminals, and becomes faster in accordance with increase in cross-sectional area of the space to be filled.

Figure 10:
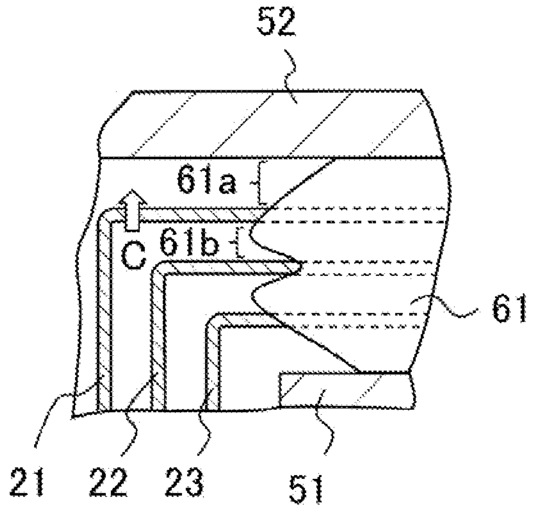
FIG. 10 is a schematic diagram showing a production step of the connector of the comparative example according to the first embodiment.

FIG. 10 is a schematic diagram showing a state where the molding resin 61 is loaded into the space between the lower mold 51 and the upper mold 52 in a production step of the connector of the comparative example. In the connector of the comparative example, the filling speed of the molding resin 61 is slowest in the vicinities of the lower mold 51 and the upper mold 52, is next slowest in the vicinities of the conductive terminals 21, 22, 23, and is fastest in the spaces between the conductive terminals 21, 22, 23. As a result, as shown in FIG. 10, the molding resin 61 between the conductive terminal 21 and conductive terminal 22, and between the conductive terminal 22 and the conductive terminal 23 is loaded faster than the molding resin in other parts. At this time, a molding resin 61*b* on the lower side of the conductive terminal 21 is loaded to the depth of the mold faster than a molding resin 61*a* on the upper side of the conductive terminal 21. Therefore, a force is applied to the conductive terminal 21 in the direction of an arrow C in FIG. 10. Meanwhile, the molding resin on the upper side of the conductive terminal 22 and the molding resin on the lower side of conductive terminal 22 are substantially equally loaded. Therefore, the force in the direction of the arrow C is not applied to the conductive terminal 22. Further, the molding resin on the upper side of the conductive terminal 23 is loaded to the depth of the mold faster than the molding resin on the lower side of the conductive terminal 23. Therefore, a force in a direction opposite to the direction of the arrow C is applied to the conductive terminal 23.

Figure 11:
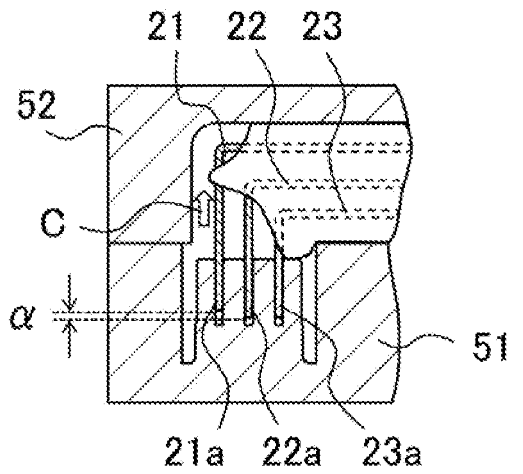
FIG. 11 is a schematic diagram showing a production step of the connector of the comparative example according to the first embodiment.

FIG. 11 is a schematic diagram showing a state where the molding resin 61 is loaded in a production step of the connector of the comparative example. As shown in FIG. 11, in the production step of the connector of the comparative example, a force is applied to the conductive terminal 21 in the direction of an arrow C. This force acts in the direction in which the leading end of the conductive terminal 21 is pulled out from the terminal insertion portion of the lower mold 51. Therefore, there is a possibility that the leading end of the conductive terminal 21 is upwardly moved by α. As a result, the length of the connector terminal 21*a* is reduced by α compared with those of the connector terminals 22*a*, 23*a*. That is, in the connector of the comparative example, variation in length of the connector terminals is caused when the connector is produced by insert molding.

Figure 12:
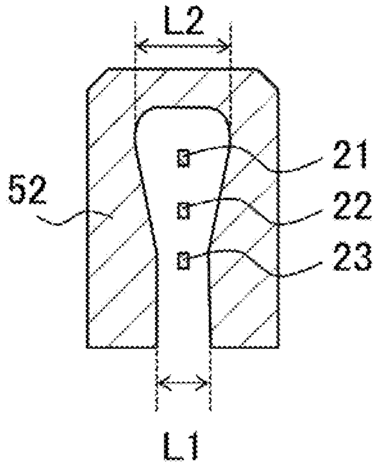
FIG. 12 is a cross-sectional view of an upper mold for the connector according to the first embodiment.

Next, a production method for the connector of the present embodiment will be described. FIG. 12 is a cross-sectional view of the upper mold 52, viewed from B-B in FIG. 5, in a production step of the connector of the present embodiment. As shown in FIG. 12, the width of the cavity portion of the upper mold 52 that will become the housing portion 2 of the connector of the present embodiment is varied in the direction in which the conductive terminals 21, 22, 23 are arranged. The width of the cavity portion of the upper mold 52 at the part to be in contact with the lower mold is defined as L1, and the width of the cavity portion, of the upper mold 52, at the farthest position from the lower mold is defined as L2. L2 is set to be larger than L1. That is, the width of the cavity portion of the upper mold 52 becomes large in accordance with increase in the distance from the lower mold.

Figure 13:
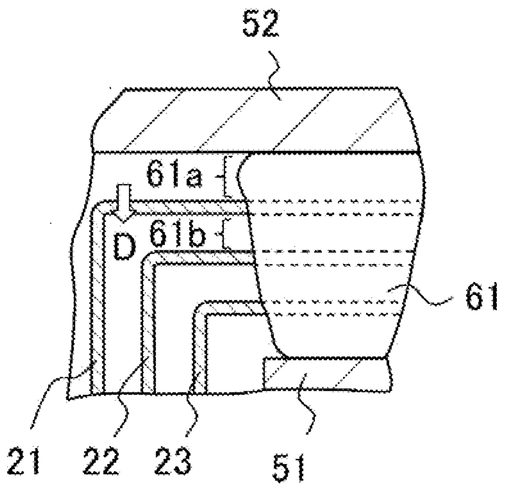
FIG. 13 is a schematic diagram showing a production step of the connector according to the first embodiment.

FIG. 13 is a schematic diagram showing a state where the molding resin 61 is loaded into the space between the lower mold 51 and the upper mold 52, in a production step of the connector of the present embodiment. In the production step of the connector of the present embodiment, since the width of the cavity portion of the upper mold 52 becomes large in accordance with increase in the distance from the lower mold, the filling speed of the molding resin 61 in the vicinity of the conductive terminal 21 is fastest, the filling speed of the molding resin 61 in the vicinity of the conductive terminal 22 is next fastest, and the filling speed of the molding resin 61 in the vicinity of the conductive terminal 23 is slowest. Therefore, as shown in FIG. 13, the molding resin 61*a* on the upper side of the conductive terminal 21 is loaded to the depth of the mold faster than the molding resin 61*b* on the lower side of the conductive terminal 21. Therefore, a force is applied to the conductive terminal 21 in the direction of an arrow D in FIG. 13. This force acts in the direction in which the leading end of the conductive terminal 21 is pressed into the terminal insertion portion of the lower mold 51. Therefore, the leading end of the conductive terminal 21 is not moved upwardly. Accordingly, the length of the connector terminal 21*a* does not become less than those of the connector terminals 22*a*, 23*a*. That is, in the connector of the present embodiment, variation in length of the connector terminals is not caused when the connector is produced by insert molding.

Figure 14:
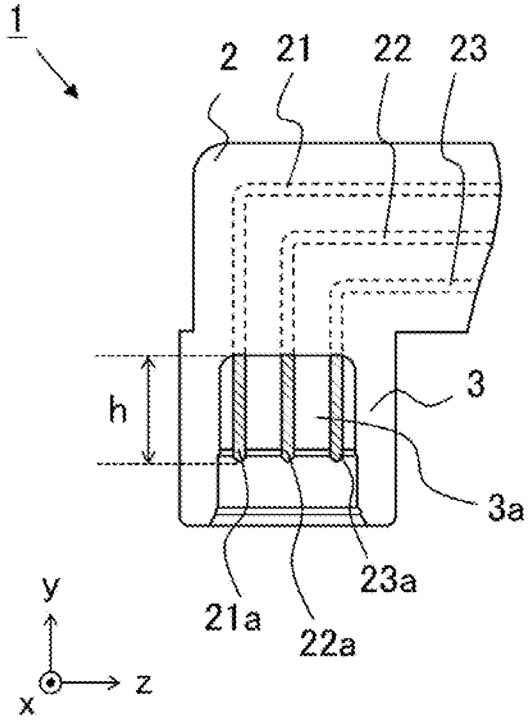
FIG. 14 is a side view of the connector according to the first embodiment.

FIG. 14 is a side view of the connector of the present embodiment. In FIG. 14, the part of the connector portion 3 is shown in a cross section. In the connector 1 of the present embodiment, the width in the x-axis direction of the housing portion 2 is increased in accordance with the distance in the y-axis direction from the connector portion 3. Therefore, occurrence of variation in a length h of the connector terminals 21*a*, 22*a*, 23*a* can be prevented when the connector 1 is produced by insert molding.

Although the connector of the present embodiment is provided with three conductive terminals, the connector of the present embodiment only needs to be provided with two or more conductive terminals. In the connector of the present embodiment, the three conductive terminals are disposed so as to be arranged on the yz-plane. The three conductive terminal need not necessarily be disposed so as to be arranged on a single plane, and may be slightly displaced from a single plane.

Second Embodiment

Similar to the first embodiment, in a connector according to a second embodiment, the width in the x-axis direction of the housing portion is increased in accordance with the distance in the y-axis direction from the connector portion 3. Further, in the connector of the present embodiment, the thickness of the resin in the x-axis direction in the housing portion is specified.

Figure 15:
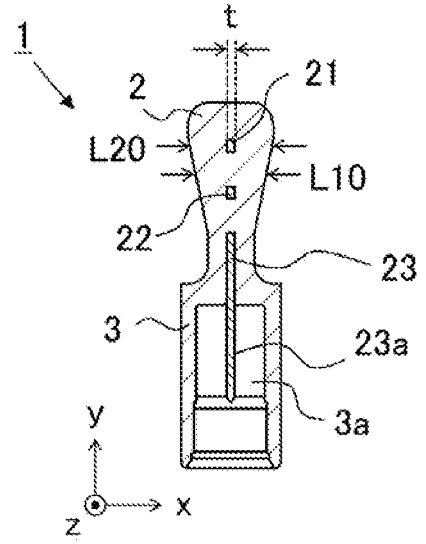
FIG. 15 is a cross-sectional view of a connector according to a second embodiment.

FIG. 15 is a cross-sectional view of the connector of the present embodiment. FIG. 15 is a cross-sectional view corresponding to FIG. 3 of the connector of the first embodiment. The width in the x-axis direction of the housing portion 2 between the conductive terminal 21 and the conductive terminal 22 is defined as L10, and the width in the x-axis direction of the part, of the housing portion 2, in which the conductive terminal 21 is present is defined as L20. In addition, the width in the x-axis direction of the conductive terminals 21, 22, 23 is defined as t. In the connector 1 of the present embodiment, L20>L10+t is established. That is, in the housing portion 2, the width of the molding resin in the x-axis direction excluding the width of the conductive terminal is increased in accordance with the distance in the y-axis direction from the connector portion 3. In other words, in the connector 1 of the present embodiment, the thickness of the molding resin in the x-axis direction in the housing portion 2 is increased in accordance with the distance in the y-axis direction from the connector portion 3.

In the connector having such a configuration, the space in the upper mold into which the molding resin is loaded when the connector is produced by insert molding is assuredly increased in accordance with increase in the distance from the lower mold. Therefore, the filling speed of the molding resin is assuredly increased in accordance with increase in the distance from the lower mold. Therefore, the force indicated by the arrow D in FIG. 13 of the first embodiment is assuredly applied. Thus, occurrence of variation in length of the connector terminals when the connector is produced by insert molding can be assuredly prevented.

Third Embodiment

Similar to the first embodiment, in a connector according to a third embodiment, the width in the x-axis direction of the housing portion is increased in accordance with the distance in the y-axis direction from the connector portion 3. Further, in the connector of the present embodiment, the increase amount of the width in the x-axis direction of the housing portion is specified.

Figure 16:
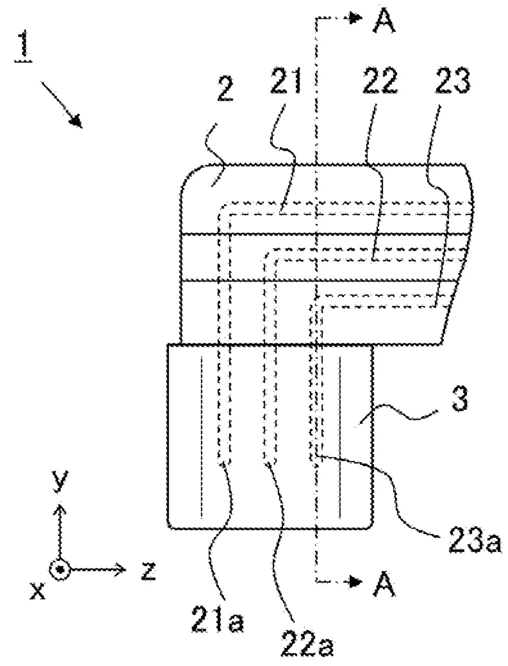
FIG. 16 is a side view of a connector according to a third embodiment.
Figure 17:
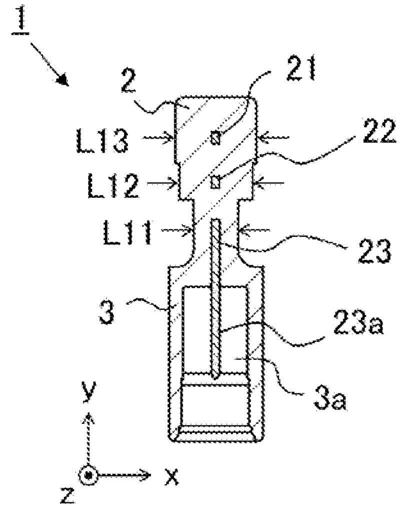
FIG. 17 is a cross-sectional view of the connector according to the third embodiment.

FIG. 16 is a side view of a connector 1 according to the present embodiment. In FIG. 16, three L-shaped conductive terminals 21, 22, 23 having different sizes and fixed to the inside of the connector 1 are indicated by broken lines. FIG. 17 is a cross-sectional view of the connector 1, viewed from A-A in FIG. 16. As shown in FIG. 17, the width in the x-axis direction of the housing portion 2 is increased stepwise in accordance with the distance in the y-axis direction from the connector portion 3. In other words, the width in the x-axis direction of the housing portion 2 is discontinuously increased in accordance with the distance in the y-axis direction from the connector portion 3. In the connector 1 of the present embodiment, when the width in the x-axis direction of the part, of the housing portion 2, in which the conductive terminal 23 extends in the z-axis direction is defined as L11, the width in the x-axis direction of the part, of the housing portion 2, in which the conductive terminal 22 extends in the z-axis direction is defined as L12, and the width in the x-axis direction of the part, of the housing portion 2, in which the conductive terminal 21 extends in the z-axis direction is defined as L13, L11<L12<L13 is established.

In the connector having such a configuration, the space in the upper mold into which the molding resin is loaded when the connector is produced by insert molding is assuredly increased in accordance with increase in the distance from the lower mold. Therefore, the filling speed of the molding resin is assuredly increased in accordance with increase in the distance from the lower mold. Therefore, the force indicated by the arrow D in FIG. 13 of the first embodiment is assuredly applied. Thus, occurrence of variation in length of the connector terminals when the connector is produced by insert molding can be assuredly prevented.

Fourth Embodiment

Similar to the first embodiment, in a connector according to a fourth embodiment, the width in the x-axis direction of the housing portion is increased in accordance with the distance in the y-axis direction from the connector portion 3. In the connector of the present embodiment, the shape of each conductive terminal is different from that of the connector of the first embodiment.

Figure 18:
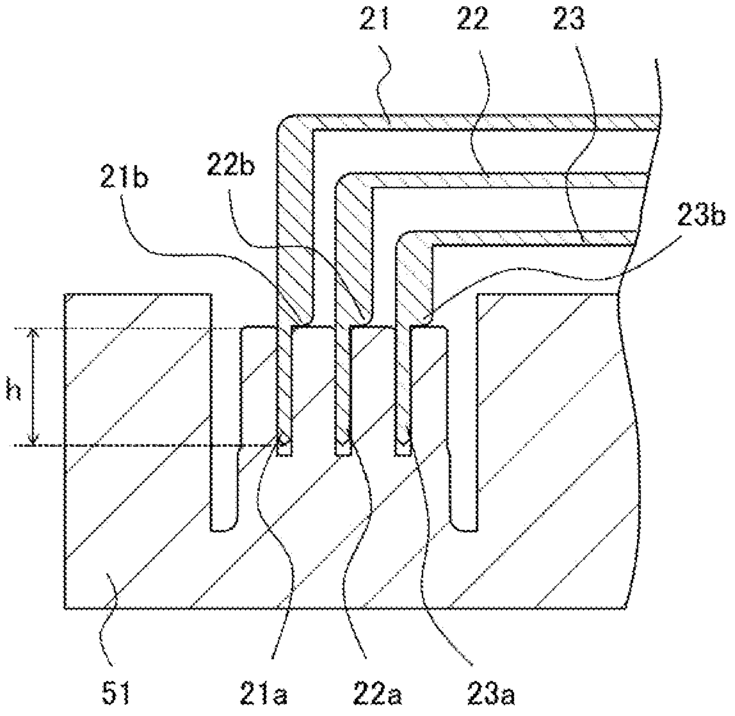
FIG. 18 is a schematic diagram showing a production step of a connector according to a fourth embodiment.

FIG. 18 is a schematic diagram showing a production step of the connector according to the present embodiment. As shown in FIG. 18, leading end portions of the conductive terminals 21, 22, 23 are inserted into the terminal insertion portion of the lower mold 51. In the connector according to the present embodiment, contact portions **21*b*, 22*b*, 23*b* which come into contact with the lower mold 51 are provided to the roots of the connector terminals 21*a*, 22*a*, 23*a* of the conductive terminals 21, 22, 23, respectively. The distance between the contact portions 21*b*, 22*b*, 23*b* and the leading ends of the conductive terminals 21, 22, 23 is equal to the length h of the connector terminals 21*a*, 22*a*, 23*a*. The width of the contact portions 21*b*, 22*b*, 23*b* is larger than the width of the connector terminals 21*a*, 22*a*, 23*a*. The leading end portions of the conductive terminals 21, 22, 23 are inserted into the terminal insertion portion of the lower mold 51 until the contact portions 21*b*, 22*b*, 23*b* come into contact with the lower mold 51**. The configuration of the connector according to the present embodiment is the same as the configuration of the connector of the first embodiment except for the contact portions.

In the connector of the present embodiment as well, the force indicated by the arrow D in FIG. 13 of the first embodiment is applied. At this time, since the contact portion of each conductive terminal is in contact with the lower mold 51, the leading end portion of the conductive terminal can be prevented from being inserted into the terminal insertion portion more than necessary. In addition, since the force indicated by the arrow D in FIG. 13 of the first embodiment is applied between the contact portion and the mold, the force is not applied to the leading end portion of the conductive terminal. Therefore, deformation at the time when the leading end portion of the conductive terminal comes into contact with the terminal insertion portion can be prevented. As a result, in the connector of the present embodiment, occurrence of variation in length of the connector terminals when the connector is produced by insert molding can be assuredly prevented, and deformation of the connector terminals can be prevented.

In the connector of the present embodiment produced by insert molding, the contact portions **21*b*, 22*b*, 23*b* of the conductive terminals 21, 22, 23** are covered by the resin. Therefore, in the connector of the present embodiment, the cross-sectional area of the part, of one end portion of each conductive terminal, covered by the resin is larger than the cross-sectional area of the corresponding connector terminal being the part exposed from the resin.

Fifth Embodiment

Figure 19:
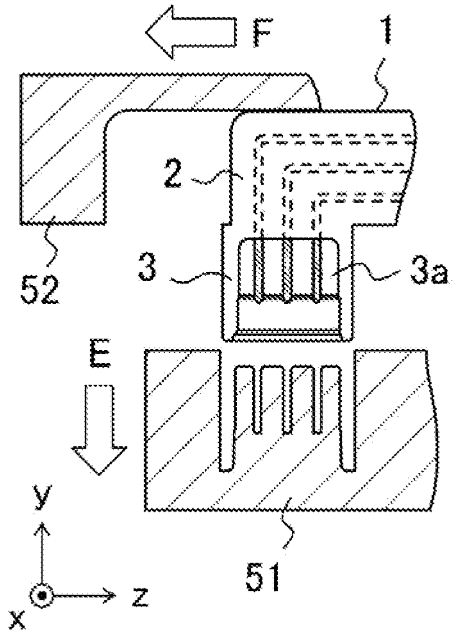
FIG. 19 is a schematic diagram showing a connector production step according to a fifth embodiment.

A fifth embodiment relates to a production method of the connectors described in the first embodiment to the fourth embodiment. The connector production method according to the present embodiment is similar to the production method shown with reference to FIG. 4 and FIG. 5 regarding the first embodiment. FIG. 19 is a schematic diagram showing the last production step in the connector production method according to the present embodiment. FIG. 19 shows directions in which the lower mold 51 and the upper mold 52 are opened after completion of the insert molding of the connector. FIG. 19 also shows the produced connector 1.

In general, the upper mold and the lower mold are opened/closed in a coaxial direction. In the connector production method of the present embodiment, the opening **3*a* of the connector portion 3 is open in the y-axis direction. Thus, the lower mold 51 is opened in the y-axis direction, that is, in the direction of an arrow E in FIG. 19. However, since the width in the x-axis direction of the housing portion 2 is increased in accordance with the distance in the y-axis direction from the connector portion 3, an undercut is present in the upper mold 52 when the upper mold 52 is to be opened in the y-axis direction. An undercut means a shape in which, when a molded article is to be taken out from a mold, the molded article cannot be taken out as is. When the upper mold 52 has an undercut, it is necessary to set the width in the x-axis direction of the housing portion 2 so as to prevent the problem that the connector 1 cannot be released from the upper mold 52. Therefore, for example, the difference between L1 and L2** in the connector of the first embodiment cannot be freely set.

In the connector production method of the present embodiment, the upper mold 52 is opened in the z-axis direction, that is, in the direction of an arrow F in FIG. 19. By using such a production method, it is possible to freely set the difference between L1 and L2, and assuredly prevent occurrence of variation in length of the connector terminals when the connector is produced by insert molding.

Although the present disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the present disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 connector
2 housing portion
3 connector portion
3*a* opening
21, 22, 23 conductive terminal
21*a*, 22*a*, 23*a* connector terminal
21*b*, 22*b*, 23*b* contact portion
51 lower mold
52 upper mold
61, 61*a*, 61*b* molding resin

What is claimed is:

1. A connector comprising:
a housing portion in which a plurality of conductive terminals having an L-shape and having different sizes are covered by a resin; and
a connector portion in which one end portions of the conductive terminals are exposed from the resin to serve as connector terminals, wherein
the plurality of conductive terminals are disposed so as to be arranged along a plane, and
when the plane is defined as a yz-plane and a direction in which the connector terminals are arranged is defined as a z-axis direction,
the connector terminals are disposed so as to be arranged with an interval therebetween in the z-axis direction, and
a width in an x-axis direction of the housing portion is increased in accordance with a distance in a y-axis direction from the connector portion.

2. The connector according to claim 1, wherein
the width in the x-axis direction of the housing portion is discontinuously increased in accordance with the distance in the y-axis direction from the connector portion.

3. The connector according to claim 2, wherein
a thickness of the resin in the x-axis direction in the housing portion is increased in accordance with the distance in the y-axis direction from the connector portion.

4. The connector according to claim 3, wherein
a cross-sectional area of a part, of the one end portion of each conductive terminal, covered by the resin is larger than a cross-sectional area of the corresponding connector terminal being a part exposed from the resin.

5. The connector according to claim 2, wherein
a cross-sectional area of a part, of the one end portion of each conductive terminal, covered by the resin is larger than a cross-sectional area of the corresponding connector terminal being a part exposed from the resin.

6. The connector according to claim 1, wherein
a thickness of the resin in the x-axis direction in the housing portion is increased in accordance with the distance in the y-axis direction from the connector portion.

7. The connector according to claim 6, wherein
a cross-sectional area of a part, of the one end portion of each conductive terminal, covered by the resin is larger than a cross-sectional area of the corresponding connector terminal being a part exposed from the resin.

8. The connector according to claim 1, wherein
a cross-sectional area of a part, of the one end portion of each conductive terminal, covered by the resin is larger than a cross-sectional area of the corresponding connector terminal being a part exposed from the resin.

* * * * *